United States Patent [19]

Richter

[11] Patent Number: 5,707,203
[45] Date of Patent: Jan. 13, 1998

[54] PALLET UNLOADING METHOD FOR PICK-UP TRUCKS

[76] Inventor: Robert A. Richter, 1231 Goldenrain Rd. #70G, Seal Beach, Calif. 90740

[21] Appl. No.: 782,156

[22] Filed: Jan. 13, 1997

Related U.S. Application Data

[60] Provisional application No. 60/011,392 Feb. 9, 1996.
[51] Int. Cl.$^6$ ............................................. B60P 1/43
[52] U.S. Cl. .................. 414/786; 414/477; 414/522; 414/537
[58] Field of Search ........................ 414/786, 494, 414/500, 537, 538, 522, 477–480

[56] References Cited

U.S. PATENT DOCUMENTS

| | | | |
|---|---|---|---|
| 1,252,899 | 1/1918 | Greer et al. | 414/500 |
| 1,567,478 | 12/1925 | Vonnez et al. | 414/500 |
| 1,730,480 | 10/1929 | Shirreff | 414/522 |
| 2,021,952 | 11/1935 | Wren | 414/500 |
| 2,065,833 | 12/1936 | Stratton et al. | 414/478 X |
| 3,159,295 | 12/1964 | Love | 414/500 X |
| 3,381,835 | 5/1968 | Lee | 414/522 X |
| 3,471,045 | 10/1969 | Parciocco | 414/522 |
| 3,687,314 | 8/1972 | Haugland | 414/537 X |
| 3,877,594 | 4/1975 | Coakley | 414/538 X |
| 4,329,752 | 5/1982 | Forrest | 414/500 X |
| 5,305,486 | 4/1994 | Smith et al. | 414/537 X |
| 5,328,320 | 7/1994 | Farrow et al. | 414/537 X |
| 5,380,141 | 1/1995 | Flowers | 414/480 X |
| 5,562,391 | 10/1996 | Green | 414/500 |
| 5,603,600 | 2/1997 | Egan et al. | 414/538 X |

Primary Examiner—David A. Bocci

[57] ABSTRACT

A truck having a flat body is fitted with a tram to unload burdened pallets. The tram travels on rails and rollers fastened to the truck body. A burdened pallet on the tram is to be unloaded from the truck. A winch pulls the tram rearward and as the tram and load begin to tilt, one or more fixed restraining cables control the tilt. On contact with the ground a restraining pin holding the pallet from proceeding down the grade, automatically retracts allowing the pallet and burden to move down the tram. A flat adjustable spring bears against the pallet, reducing its velocity. The truck is moved forward and the pallet and burden rests on the ground. The tram is retracted into the truck by the winch. The truck driver closes the tailgate.

1 Claim, 2 Drawing Sheets

PALLET UNLOADING METHOD FOR PICK-UP TRUCKS

This application claims the benefit of U.S. Provisional Application No. 60/011,392, filed Feb. 9, 1996

BACKGROUND—FIELD OF INVENTION

This invention relates to unloading a burdened pallet from a pick-up truck.

BACKGROUND—DESCRIPTION OF PRIOR ART

This invention deals with the field of unloading pick-up trucks. The most common use for such a device is hauling contractors' building supplies on a standard pallet. Loading the pallet on the pick-up is provided by the building supplier with a forklift truck. There are many uses and arguments for this device:

(a) Building contractors will be able to use "Just-In-Time" construction assembly.
(b) Conservation of manpower in unloading these vehicles, by one man in five minutes.
(c) Cost reduction by eliminating security costs in overnight supplies storage.
(d) Presently supply trucks have a multitude of unloading stops, delivering all day. If the supplies are required in the morning, the contractor may not receive them until late in the afternoon, and the men are standing around. With this new method, the material can be delivered in the early morning every day for a day's work.

Most suppliers will load a pallet at night to be ready for the contractor's pick-up in the morning for a day's construction. The driver delivers it to the site and unloads it in a few minutes with no damage. In the present method it takes two men to unload bricks, cement blocks, lumber, dry wall sheets, plywood, garden supplies, etc. One man on the pick-up and one man on the ground. Throwing supplies by one man on the truck results in broken masonry, broken bags of cement, broken edges of drywall, and split lumber.

This invention will ease the loaded pallet to the ground in less than five minutes by one man sitting in the truck cab operating an electric switch, with no breakage. Most suppliers will either "band" lumber or plastic wrap a loaded pallet at no extra cost, to keep the load intact in transit.

Farmers have use for this unloader in feeding animals, unloading bales of hay, bags of feed, seed, fencing material, etc.

General types of container loaders and ramps have been proposed. For example U.S. Pat. Nos. 3,889,287 (1975), 4,346,929 (1982), 5,203,668 (1993), 3,421,645 (1969), and ramps 4,624,619 (1986), 5,287,579 (1994), 5,312,149 (1994), 5,391,038 (1995), 5,403,142 (1995), 5,470,188 (1995), 5,476,360 (1995), and others. All of these approach other fields such as containers and ramps for wheeled machines.

BRIEF DESCRIPTION OF THE DRAWINGS

While the invention is particularly pointed out and distinctly claimed in the concluding portion herein, a preferred embodiment is set forth in the following detailed descriptions which may be best understood when read in connection with the accompanying drawings in which:

DETAILED DESCRIPTION OF THE PREFERRED EMBODIMENT

Figure 1:
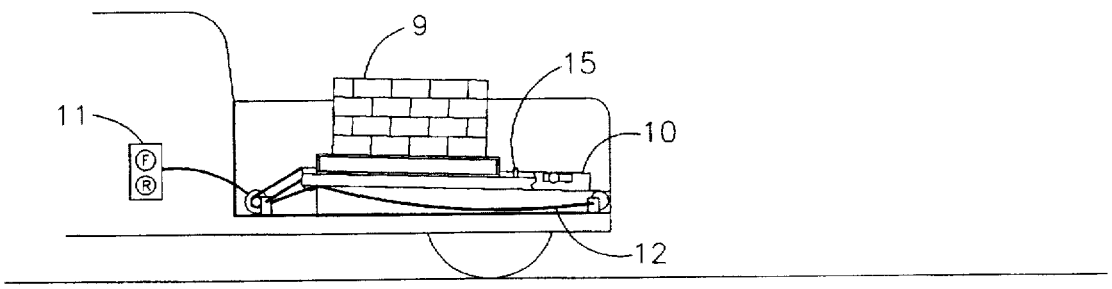
FIG. 1 is a side view of an embodiment of the improved apparatus for the unloading of a pallet with respect to a pick-up truck. The present invention is shown in the initial stages of unloading.
Figure 2:
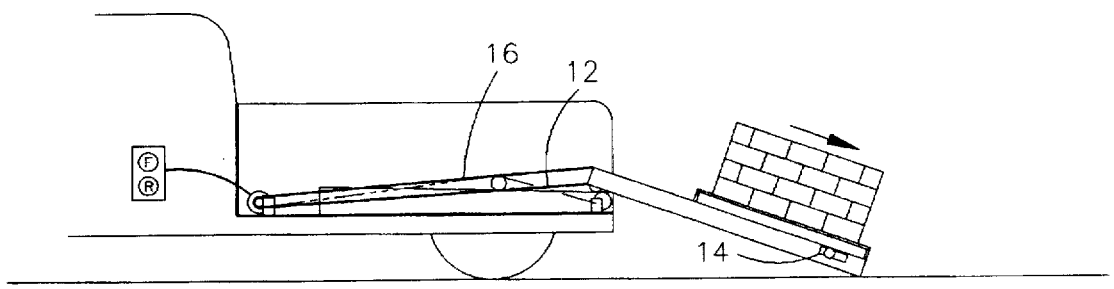
FIG. 2 is an illustration of the embodiment shown in FIG. 1 at a later stage of unloading with an angle approximately 30 degrees to the ground.

The present invention provides an improved apparatus for unloading of a burdened pallet. A typical embodiment of this invention is illustrated in FIG. 1 wherein a standard grocers' pallet burdened with cement blocks 9 has been loaded on the tram 10 in the pick-up by the supplier's forklift truck. The tram 10 is supported by three rails 17, 42, 46 and the rollers 20, 21, 23.

When unloading switch 11 is actuated the winch 36 winds up the cable 44 on the two-part cable reel 34 and pulls the tram 10 and burden 9 towards the rear and pick-up. During this motion the control cables 12, 13 are slack.

When the pallet and burden 9 and tram 10 begins to tilt the control cables 12, 13 bear against the pulleys 37, 38 controlling the tilt to assure that the tram assumes approximately 30 degrees with the ground. During this motion the stop pin 15 is in the up position to stop the pallet 9 and burden during the tilting motion. As the tram 10 lightly strikes the ground the lever 24 which is now in the down position strikes first retracting the tapered drift pin 15 allowing the pallet and burden 9 to travel down the tram 10.

The operator has preset the brake 14 to "heavy load" which slows the pallet 9 and it's burden to gently strike the ground. With the bottom corner of the pallet 9 into the ground the pick-up is moved forward pulling the pallet out of the brake and allowing the pallet to slide down the tram.

Figure 3:
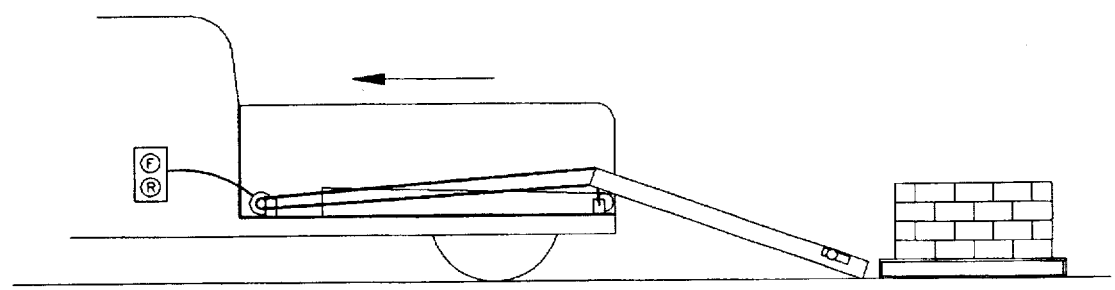
FIG. 3 is an illustration of the embodiment shown in FIG. 1 with the pick-up truck moved forward leaving the pallet on the ground.
Figure 4:
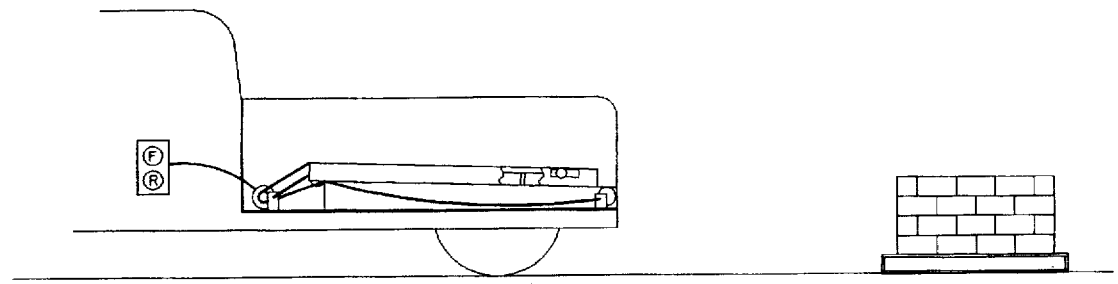
FIG. 4 is an illustration of the embodiment shown in FIG. 1 with the tram pulled forward into the pick-up body.
Figure 5:
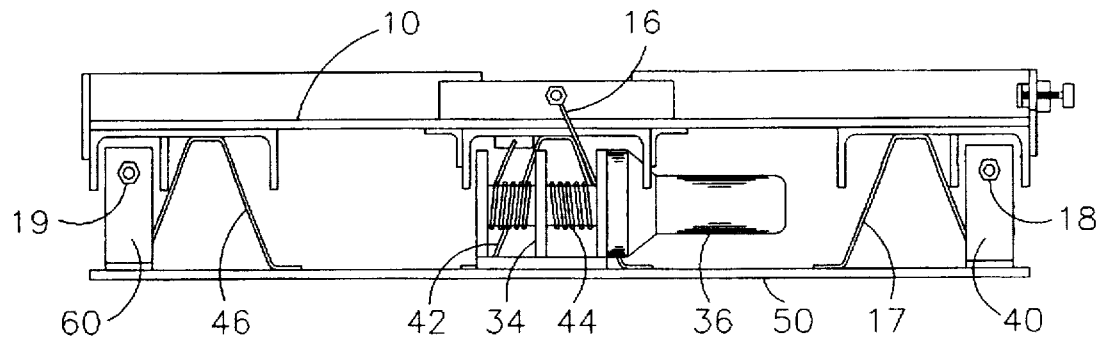
FIG. 5 is a front end view of the embodiment showing the winch, rails and tram.
Figure 6:
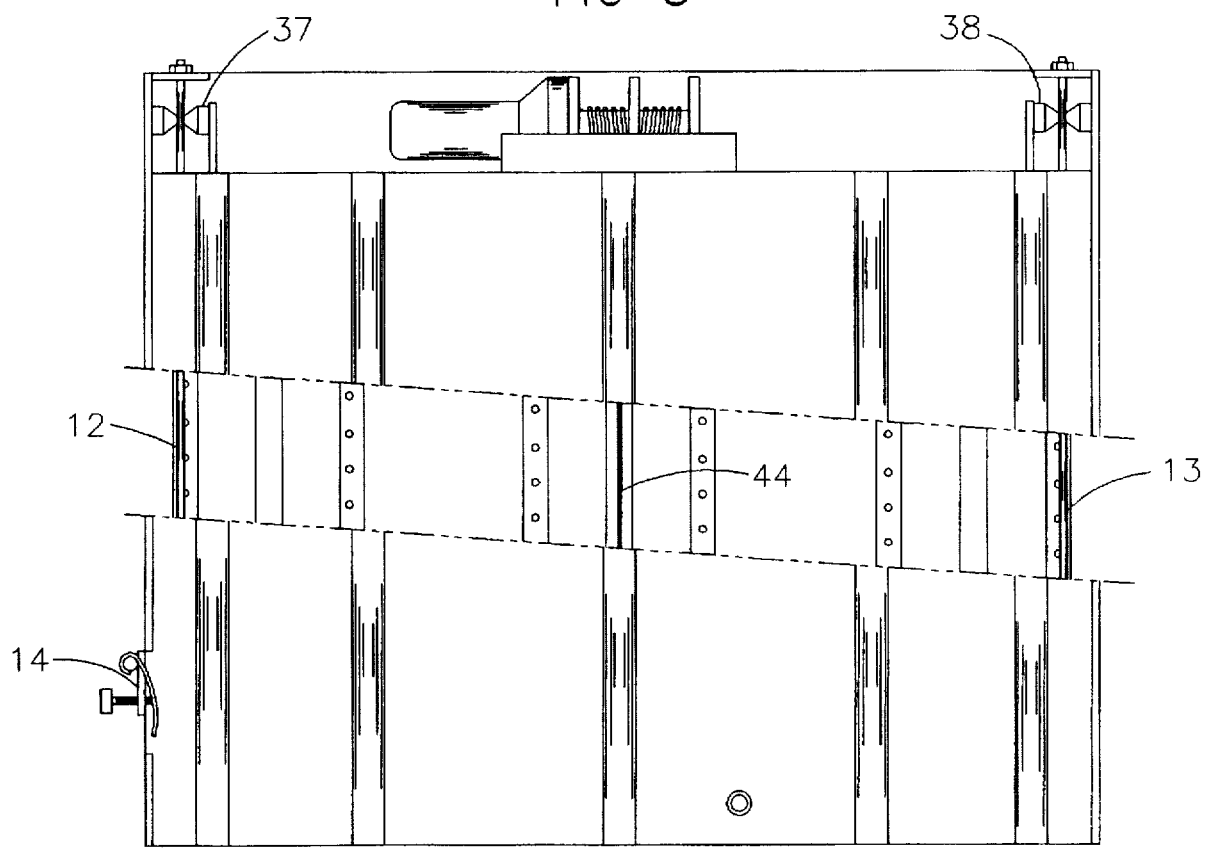
FIG. 6 is a top plan view of the embodiment with cuts to show the rails, the side restraining cables and the tram unloading cable within the center rail.
Figure 7:
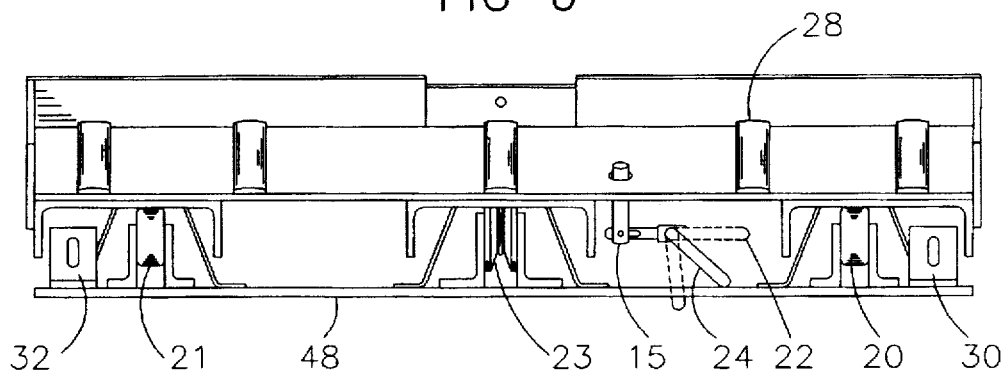
FIG. 7 is a rear view of the embodiment showing the rollers, center sheave, multi-position lever and stop pin assembly.

As illustrated in FIG. 3 and FIG. 4 the return switch 1 is depressed and the tram 10 is pulled back into the pickup by cable 16. The lever 24 slides up and snaps into the spring holder 22. The bases 48 and 50 assist in locating when assembling to the truck. The cable supports 30, 32, 40, 60 sustain the cables 12 and 13. Screw threads and nuts 18, 19 adjust the tension in cables 12, 13.

I claim:

1. A method for unloading a previously loaded burdened pallet off a truck comprising the steps of:

providing a carriage moving on rails and rollers to transport the burdened pallet rearward;

providing a means for moving said carriage rearwardly;

providing one or more fixed cables to restrain the carriage in rearward tilting travel to finally attain about 30 degrees with the ground;

providing at least one pin to prevent the burdened pallet from sliding down the carriage before an end of the carriage strikes the ground;

providing a lever system to retract said pin or pins to be activated when the carriage strikes the ground allowing the burdened pallet to slide toward the ground;

providing an adjustable brake on the carriage to slow the burdened pallet easing it to the ground; and providing means to return the carriage within the truck.

* * * * *